US012707397B2

(12) United States Patent
Patra et al.

(10) Patent No.: US 12,707,397 B2
(45) Date of Patent: Aug. 11, 2026

(54) METHODS OF LOW POWER ON EAR-BUDS IN A BTOIP (WI-FI) TOPOLOGY

(71) Applicant: QUALCOMM Incorporated, San Diego, CA (US)

(72) Inventors: Gopinath Patra, Bangalore (IN); Richard Turner, Belfast (GB); Sandip Homchaudhuri, San Jose, CA (US); Derrick Chu Lin, Hillsborough, CA (US); Mayank Batra, Cambridge (GB); Benjamin James Campbell, Bury St Edmunds (GB)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 18/685,158

(22) PCT Filed: Oct. 19, 2022

(86) PCT No.: PCT/US2022/078374
§ 371 (c)(1),
(2) Date: Feb. 20, 2024

(87) PCT Pub. No.: WO2023/069995
PCT Pub. Date: Apr. 27, 2023

(65) Prior Publication Data

US 2024/0365238 A1 Oct. 31, 2024

(30) Foreign Application Priority Data

Oct. 21, 2021 (IN) ............................ 202121047985

(51) Int. Cl.
*H04W 52/02* (2009.01)
*H04W 84/12* (2009.01)

(52) U.S. Cl.
CPC ... *H04W 52/0274* (2013.01); *H04W 52/0248* (2013.01); *H04W 84/12* (2013.01)

(58) Field of Classification Search
CPC ...................... H04W 52/0274; H04W 52/0248
See application file for complete search history.

(56) References Cited

U.S. PATENT DOCUMENTS 8,549,205 B1 * 10/2013 Harriman .............. G06F 1/3203 370/254
10,425,794 B2 * 9/2019 Lo ........................... H04B 7/26
(Continued)

FOREIGN PATENT DOCUMENTS

EP 2692152 B1 7/2016

OTHER PUBLICATIONS

International Search Report and Written Opinion—PCT/US2022/078374—ISA/EPO—Feb. 1, 2023.

*Primary Examiner* — Zhiren Qin
(74) *Attorney, Agent, or Firm* — Holland & Hart LLP

(57) ABSTRACT

A method, apparatus, and computer-readable medium are provided that improve power management for devices communicating via Bluetooth (BT) over Internet Protocol (BTOIP). The apparatus for wireless communication for a first device receives a first set of packets from a second device during a time period associated with a training phase for the first device. The apparatus determines an arrival time of a first packet of the first set of packets. The apparatus determines, based on the arrival time and a wakeup time interval, a wakeup time for the first device. The apparatus causes, based on the wakeup time for the first device and one or more attributes associated with the first set of packets, a shutdown of the first device.

28 Claims, 13 Drawing Sheets

(56) References Cited

U.S. PATENT DOCUMENTS

| | | | | |
|---|---|---|---|---|
| 10,827,333 | B1 | 11/2020 | Murali | |
| 2006/0083168 | A1* | 4/2006 | Prakash | H04L 1/205 370/230 |
| 2012/0253819 | A1* | 10/2012 | Hasegawa | G10L 25/51 704/E11.001 |
| 2013/0129126 | A1 | 5/2013 | Callias et al. | |
| 2013/0130684 | A1 | 5/2013 | Gomes et al. | |
| 2013/0300939 | A1* | 11/2013 | Chou | G06V 10/85 348/700 |
| 2013/0316649 | A1 | 11/2013 | Newham | |
| 2016/0302224 | A1* | 10/2016 | Khairmode | H04L 5/0055 |
| 2018/0047414 | A1* | 2/2018 | Kasilya Sudarsan | G08B 21/18 |
| 2019/0253965 | A1* | 8/2019 | Gan | H04W 52/02 |
| 2020/0213817 | A1* | 7/2020 | Lin | H04W 4/08 |
| 2020/0359265 | A1 | 11/2020 | Azizi et al. | |
| 2021/0100053 | A1* | 4/2021 | Park | H04L 1/1614 |
| 2022/0039009 | A1* | 2/2022 | Iyer | H04W 52/0219 |
| 2022/0150833 | A1* | 5/2022 | Li | H04W 52/0235 |
| 2024/0147362 | A1* | 5/2024 | Thyagarajan | H04W 52/0229 |

* cited by examiner

METHODS OF LOW POWER ON EAR-BUDS IN A BTOIP (WI-FI) TOPOLOGY

CROSS REFERENCE

The present Application is a 371 national stage filing of International PCT Application No. PCT/US2022/078374 by PATRA et al. entitled "METHODS OF LOW POWER ON EAR-BUDS IN A BTOIP (WI-FI) TOPOLOGY," filed Oct. 19, 2022; and claims priority to India Patent Application No. 202121047985 by PATRA et al., entitled "METHODS OF LOW POWER ON EAR-BUDS IN A BTOIP (WIFI) TOPOLOGY," filed Oct. 21, 2021, each of which is assigned to the assignee hereof, and each of which is expressly incorporated by reference in its entirety herein.

FIELD OF TECHNOLOGY

The present disclosure relates generally to communication systems, and more particularly, to power conservation in communication systems.

BACKGROUND

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, a Bluetooth® Low Energy (BLE) protocol, a Zigbee® protocol, etc.), provide wireless connectivity to peripheral devices by providing wireless links that allow connectivity within a specific distance (e.g., 5 meters, 10 meter, 20 meters, 100 meters, etc.).

BT is a short-range wireless communication protocol that supports a WPAN between a central device (e.g., a master device) and at least one peripheral device (e.g., a slave device). Power consumption associated with BT communications may render BT impractical in some applications, such as applications in which an infrequent transfer of data occurs.

To address the power consumption issue associated with BT, BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. A BLE communications link between two devices may be established using, e.g., hardware, firmware, host operating system, host software stacks, and/or host application support. Example applications that use BLE include battery-operated sensors and actuators in various medical, industrial, consumer, and fitness applications. BLE may be used to connect devices such as BLE enabled smart phones, tablets, and laptops. While traditional BT and BLE offer some advantages, further improvements in BT and BLE technology may be desired. For example, both traditional BT and BLE have limited range, limited data capacity throughput, and communication via traditional BT and BLE can suffer from severe interference from devices communicating via other wireless technologies (e.g., Wi-Fi).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Devices communicating via traditional BT and BLE suffer from several limitations that can limit user experiences and negatively affect user experiences. For example, the range of traditional BT and BLE is limited by a single hop radio frequency (RF) transmission. Additionally, traditional BT and BLE have limited data capacity, which can have several negative effects on user experience. For example, the limited data capacity of traditional BT and BLE can result in limited audio quality and/or quality below the needs of the user. Furthermore, traditional BT and BLE is enabled for radio frequency communication operating within the globally accepted 2.4 GHz Industrial, Scientific & Medical (ISM) band. However, operating only within the 2.4 GHz band can result in devices that are communicating via the BT and BLE to experience interference from other devices that are communicating wirelessly using other wireless communication technologies. Therefore, to address the foregoing limitations of traditional BT and BLE, devices may be configured to operate using BT over Internet Protocol (BToIP) protocol. The BToIP protocol enables radio frequency communication over a wireless network, such as a wireless local area network (WLAN). Therefore, the BToIP protocol enables radio frequency communication that can operate outside of the 2.4 GHz ISM band. For example, the BToIP protocol enables radio frequency communication operating within the globally accepted 5 GHz ISM band.

However, communication over a wireless network such as a WLAN can result in higher power consumption than communicating via traditional BT and/or BLE protocols. The higher power consumption can negatively affect battery life of a device and may cause the device to be charged more frequently. Therefore, improved power management for devices communicating via the BToIP protocol may be desired.

The power management techniques of the present disclosure improve battery life of devices communicating over BToIP by adjusting wakeup time intervals and shutdown times of the devices communicating over BToIP. Additional details of the power management techniques are described herein.

In an aspect of the disclosure, a method, a computer-readable medium, and an apparatus are provided. The apparatus may receive a first set of packets from a second device during a time period associated with a training phase. The apparatus may determine an arrival time of a first packet of the first set of packets. The apparatus may determine, based on the arrival time and a wakeup time interval, a wakeup time for the first device. The apparatus may cause, based on the wakeup time for the first device and one or more attributes associated with the first set of packets, a shutdown of the first device.

To the accomplishment of the foregoing and related ends, the one or more aspects comprise the features hereinafter fully described and particularly pointed out in the claims. The following description and the annexed drawings set forth in detail various illustrative features of the one or more aspects. These features are indicative, however, of but a few of the various ways in which the principles of various aspects may be employed, and this description is intended to include all such aspects and their equivalents.

DETAILED DESCRIPTION

Figure 1:
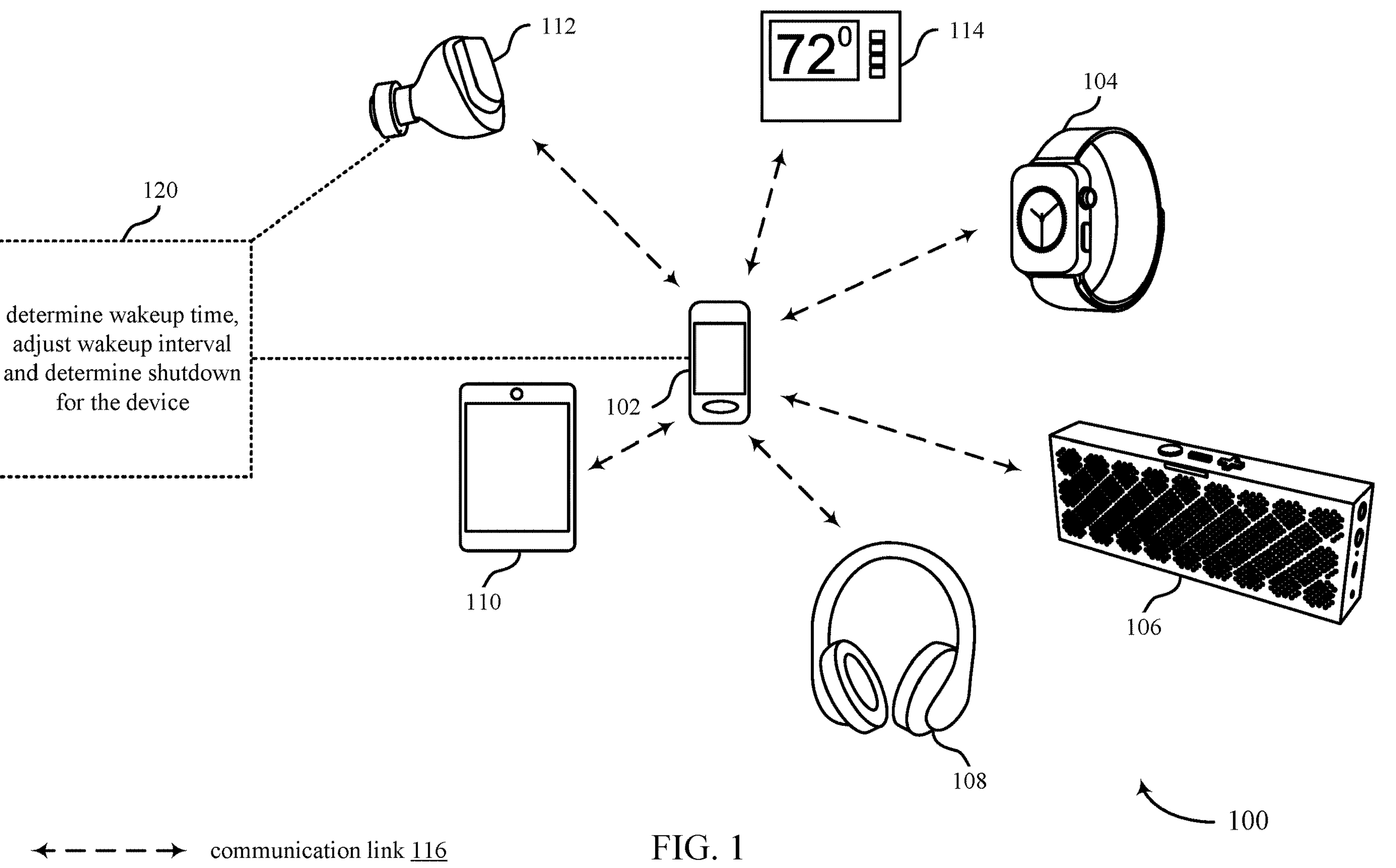
FIG. 1 is a diagram illustrating an example of a WPAN in accordance with some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with some aspects of the disclosure. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, 114 using a wireless communication protocol (e.g., traditional BT, BLE, and/or BToIP protocol) as described herein in connection with any of FIGS. 2-7. In some implementations, The central device 102 may operate as an initiator to request establishment of a connection with an intended peripheral device 104, 106, 108, 110, 112, 114. The connection with the peripheral device may be a link manager protocol (LMP) connection, a link layer (LL) connection, or a data link layer connection.

A LMP in the BToIP protocol stack (e.g., see FIG. 3) provides BT device discovery and reliable point-to-multipoint data transfer. A LL in the BToIP protocol stack (e.g., see FIG. 3) provides, as compared to BT, ultra-low power idle mode operation, simple device discovery and reliable point-to-multipoint data transfer with advanced power-save and encryption functionalities.

After a requested connection is established, the device 102 may become a central device and the device(s) 104, 106, 108, 110, 112, 114 may become intended peripheral device(s) for the established connection. As a central device, the device 102 may be capable of supporting multiple connections at a time with various peripheral devices 104, 106, 108, 110, 112, 114. The central device 102 may be operable to manage various aspects of data packet communication in a connection with an associated peripheral device 104, 106, 108, 110, 112, 114 (slave device). For example, the central device 102 may be operable to determine an operation schedule in the connection with a peripheral device 104, 106, 108, 110, 112, 114.

The central device 102 may be operable to initiate a protocol data unit (PDU) exchange sequence over the connection. For example, the central device 102 may be operable to initiate baseband PDU exchange sequence over LMP connection, LL PDU exchange sequence over the LL connection, and the like. The connections (e.g., LMP connection, LL connections, data link layer connections) may be configured to run periodic connection events in dedicated data channels. The exchange of data PDU (e.g., baseband PDUs, LL data PDUs, and the like) transmissions between the central device 102 and one or more of the peripheral devices 104, 106, 108, 110, 112, 114 may take place within connection events.

In some configurations, the central device 102 may be configured to transmit the first PDU (e.g., baseband PDU, LL data PDU, etc.) in each connection event to an intended peripheral device 104, 106, 108, 110, 112, 114. In some other configurations, the central device 102 may utilize a polling scheme to poll the intended peripheral device 104, 106, 108, 110, 112, 114 for a PDU (e.g., baseband PDU, LL data PDU, etc.) transmission during a connection event. The intended peripheral device 104, 106, 108, 110, 112, 114 may transmit a PDU (e.g., baseband PDU, LL data PDU, etc.) upon receipt of packet PDU (e.g., packet baseband PDU, packet LL data PDU, etc.) from the central device 102. In some other configurations, a peripheral device 104, 106, 108, 110, 112, 114 may transmit a PDU (e.g., baseband PDU, LL data PDU, etc.) to the central device 102 without first receiving a PDU (e.g., baseband PDU, LL data PDU, etc.) from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114 may include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, wireless headphones, wireless earbuds, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, 114 in the WPAN 100, the central device 102 may communicate with more or fewer than six peripheral devices within the WPAN 100 without departing from the scope of the present disclosure.

Referring again to FIG. 1, in some aspects, the peripheral devices 104, 106, 108, 110, 112, 114 may be configured to determine wakeup time, adjust wakeup time interval, and determine shutdown (120) for the device, e.g., as described below in connection with any of FIGS. 2-7.

Figure 2:
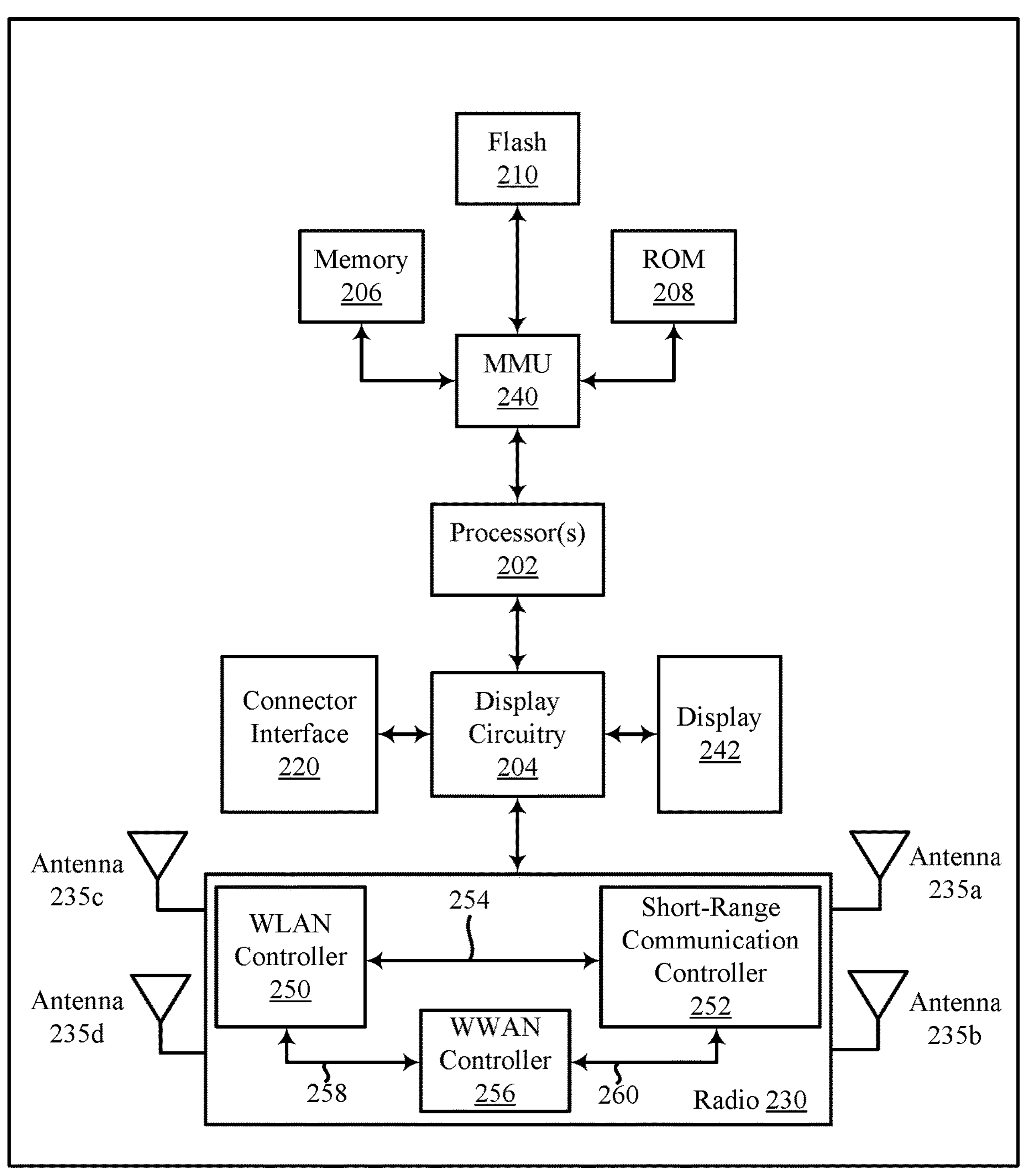
FIG. 2 is block diagram of a wireless device in accordance with some aspects of the disclosure.

FIG. 2 is block diagram of a wireless device 200 in accordance with some aspects of the disclosure. The wireless device 200 may correspond to, e.g., the central device 102, and/or one of peripheral devices 104, 106, 108, 110, 112, 114 described above in connection with FIG. 1. In some aspects, the wireless device 200 may be a BLE enabled device.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235*a*, 235*b*, 235*c*, 235*d*, for performing wireless communication with, e.g., wireless devices in a WPAN.

In some aspects, the wireless device 200 may include hardware and software components (a processing element) configured to adjust wakeup time interval and shutdown time for the device, e.g., using the techniques described below in connection with any FIGS. 3-7. The wireless device 200 may also comprise BT and/or BLE firmware or other hardware/software for controlling BT and/or BLE operations.

The wireless device 200 may be configured to implement part or all of the techniques described herein in connection with any of FIGS. 3-7, e.g., by executing program instructions stored on a memory medium (e.g., a non-transitory computer-readable memory medium) and/or through hardware or firmware operation. In some implementations, the techniques described herein in connection with any of FIGS. 3-7 may be at least partially implemented by a programmable hardware element, such as an field programmable gate array (FPGA), and/or an application specific integrated circuit (ASIC).

In some aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In some aspects, the wireless device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In some implementations, a first coexistence interface 254 (e.g., a wired interface) may be used for sending information between the WLAN controller 250 and the short-range communication controller 252. In some other implementations, a second coexistence interface 258 may be used for sending information between the WLAN controller 250 and the WWAN controller 256. In some other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In some configurations, the WLAN controller 250 may be configured to communicate with a second device in a WPAN using a WLAN link using all of the antennas 235*a*, 235*b*, 235*c*, 235*d*. In some other configurations, the short-range communication controller 252 may be configured to communicate with at least one second device in a WPAN using one or more of the antennas 235*a*, 235*b*, 235*c*, 235*d*. In some other configurations, the WWAN controller 256 may be configured to communicate with a second device in a WPAN using all of the antennas 235*a*, 235*b*, 235*c*, 235*d*. The WLAN controller 250, the short-range communication controller 252, and/or the WWAN controller 256 may be configured to adjust wakeup time interval and shutdown time for the device.

Figure 3:
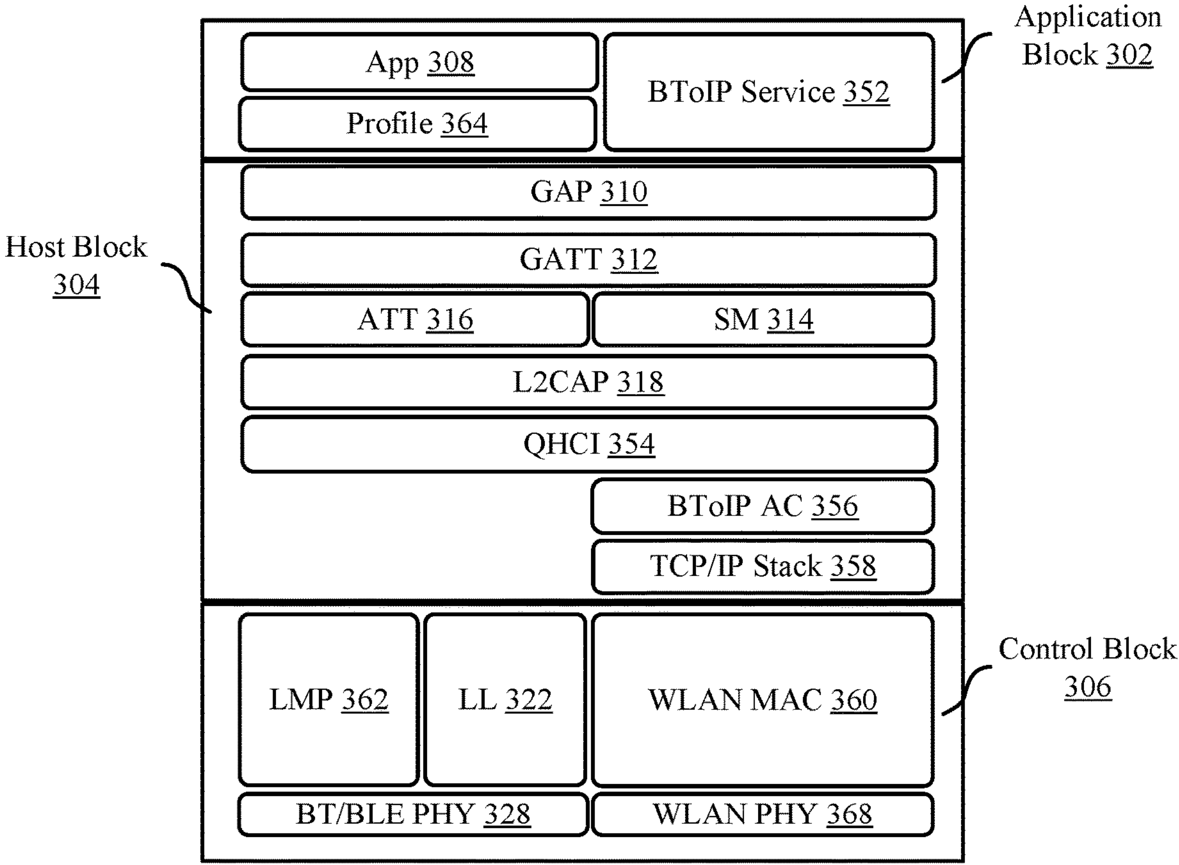
FIG. 3 is a diagram illustrating an example BToIP protocol stack in accordance with some aspects of the disclosure.

FIG. 3 illustrates an example BToIP protocol stack 300 that may be implemented in a device (e.g., central device 102, peripheral devices 104, 106, 108, 110, 112, 114, and the like) in accordance with some aspects of the present disclosure. For example, the BToIP protocol stack 300 may be implemented by, e.g., one or more of processor(s) 202, memory 206, Flash memory 210, ROM 208, the radio 230, and/or the short-range communication controller 252 illustrated in FIG. 2.

The BToIP protocol stack may include layers of traditional BT/BLE protocol stacks, layers of WLAN protocol stack, as shown in FIG. 3. Referring to FIG. 3, the BToIP protocol stack 300 may be organized into three blocks, namely, the Application block 302, the Host block 304, and the Controller block 306. Application block 302 may be a user application which interfaces with the other blocks and/or layers of the BToIP protocol stack 300. The Host block 304 may include the upper layers of the traditional BT/BLE protocol stack, and the Controller block 306 may include the lower layers of the traditional BT/BLE protocol stack, WLAN protocol stack, and layers of BToIP protocol.

The Host block 304 may communicate with a controller (e.g., short-range communication controller 252 in FIG. 2) in a wireless device using a Host Controller Interface (HCI) such as QHCI 354. The QHCI 354 may also be used to interface the Controller block 306 with the Host block 304. Interfacing the Controller block 306 and the Host block 304 may enable a wide range of Hosts to interface with the Controller block 306.

The Application block 302 may include a higher-level Application Layer (App) 308, Profile Layer (Profile) 364, and BToIP Service layer 352. The Host block 304 may include a Generic Access Profile (GAP) 310, a Generic Attribute Protocol (GATT) 312, a Security Manager (SM) 314, an Attribute Protocol (ATT) 316, and a Logical Link Control and Adaptation Protocol (L2CAP) 318, each of which are described in further detail below. The Controller block 306 may include a LL 322, a LMP 362, QHCI 354, a BToIP Application Controller (BToIP AC) 356, TCP/IP stack 358, WLAN MAC 360, a Physical Layer (BT/BLE PHY) 328, and a WLAN Physical Layer (WLAN PHY) 368, each of which are described in further detail below.

To support future applications (e.g., IoT applications, audio applications, etc.), the BT/BLE PHY 328 of the present disclosure may support an increased range of communication and data rate as compared to the PHY in a traditional BT/BLE protocol stack. In some implementations, the WLAN PHY 368 of the present disclosure may support an increased range of communication and data rate as compared to the PHY in a traditional WLAN protocol stack. The BT/BLE PHY 328 may define the mechanism for transmitting a bit stream over a physical BT/BLE link that connects two or more devices (e.g., BT/BLE devices). The bit stream may be grouped into code words or symbols, and converted to a PDU (e.g., LL PDU, baseband PDU, and the like) that is transmitted over a transmission medium. The WLAN PHY 368 may define the mechanism for transmitting a bit stream over a physical WLAN link that connects two or more devices (e.g., WLAN devices). The BT/BLE PHY 328 and WLAN PHY 368 may provide an electrical, mechanical, and procedural interface to the transmission medium. The shapes and properties of the electrical connectors, the frequency band used for transmission, the modulation scheme, and similar low-level parameters may be specified by the BT/BLE PHY 328 and WLAN PHY 368.

The LMP 362 may be responsible for low level communication over the BT/BLE PHY 328. The LMP 362 may manage the sequence and timing of transmitted and received baseband PDUs, and using LM protocol, communicate with other devices regarding connection parameters and data flow control. In some implementations, the LMP 362 may provide gate keeping functionality to limit exposure and data exchange with other devices regarding connection parameters and data flow control. The LMP 362 may provide gate keeping functionality to limit exposure and data exchange with other devices. In some implementations, the LMP 362 may maintain a list of allowed devices and ignore all requests for baseband PDU exchange from devices not on the list. The LMP 362 may use the QHCI 354 to communicate with upper layers of the BToIP protocol stack 300. In some aspects, the LMP 362 may be used to generate a baseband PDU and/or an empty packet (e.g., empty PDU) that may be transmitted using a LMP communication link established with another traditional BT device (e.g., BR/EDR device) using the LMP 362.

The LL 322 may be responsible for low level communication over the BT/BLE PHY 328. The LL 322 may manage the sequence and timing of transmitted and received LL data PDUs, and using a LL protocol, communicate with other devices regarding connection parameters and data flow control. The LL 322 may provide gate keeping functionality to limit exposure and data exchange with other devices. If filtering is configured, the LL 322 may maintain a list of allowed devices and ignore all requests for data PDU exchange from devices not on the list. The LL 322 may use the QHCI 354 to communicate with upper layers of the BToIP protocol stack 300. In some aspects, the LL 322 may be used to generate a LL data PDU and/or an empty packet (e.g., empty PDU) that may be transmitted using a LL communication link established with another BLE device using the LL 322.

The L2CAP 318 may encapsulate multiple protocols from the upper layers into a Baseband PDU, LL data PDU, and the like (and vice versa). The L2CAP 318 may also break large PDUs (e.g., baseband PDUs, LL data PDUs, and the like) from the upper layers into segments that fit into a maximum payload size (e.g., 27 bytes) on the transmit side. Similarly, the L2CAP 318 may receive multiple PDUs (e.g., baseband PDUs, LL data PDUs, and the like) that have been segmented, and the L2CAP 318 may combine the segments into a single PDU (e.g., single baseband PDU, single LL data PDU, and the like) that may be sent to the upper layers.

The ATT 316 may be a client/server protocol based on attributes associated with a BT/BLE device configured for a particular purpose (e.g., monitoring heart rate, monitoring temperature, broadcasting advertisements, etc.). The attributes may be discovered, read, and written by other BT/BLE enabled devices. The set of operations which are executed over ATT 316 may include, but are not limited to, error handling, server configuration, find information, read operations, write operations, queued writes, etc. The ATT 316 may form the basis of data exchange between BT/BLE devices.

The SM 314 may be responsible for device pairing and key distribution. A security manager protocol implemented by the SM 314 may define how communications with the SM of a counterpart BT/BLE device are performed. The SM 314 may provide additional cryptographic functions that may be used by other components of the BToIP protocol stack 300. The architecture of the SM 314 used in traditional BT/BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BT/BLE device. The GATT 312 interfaces with the App 308 through the App's profile and/or through the profile layer 364. The App 308 profile and/or the profile layer 364 defines the collection of attributes and any permission associated with the attributes to be used in BT/BLE communications. One of the benefits of BT technology is device interoperability. To assure interoperability, using a standardized wireless protocol to transfer bytes of information may be inadequate, and hence, sharing data representation levels may be needed. In other words, BT/BLE devices may send or receive data in the same format using the same data interpretation based on intended device functionality. The attribute profile used by the GATT 312 may act as a bridge between the BToIP protocol stack and the application and functionality of the BT/BLE device (e.g., at least from a wireless connection point of view), and is defined by the profile.

The GAP 310 may provide an interface for the App 308 to initiate, establish, and manage connection with counterpart BT/BLE devices. The profile layer 364 may comprise a set of BT/BLE profiles including, but not limited to, A2DP, AVRCP, HFP, and the like. The profile layer 364 and/or the profiles of the profile layer 364 operate over L2CAP. The BToIP Service layer 352 may determine whether a second device (e.g., a central device 102, peripheral devices 104, 106, 108, 110, 112, 114, another computing device, and the like) supports BToIP protocol and/or is enabled to communicate via BToIP protocol. The BToIP Service layer 352 may be configured to exchange features (e.g., control point notifications) with the second device based on some triggers, events and/or conditions detected or determined by the first device (e.g., via processor 202 of the first device). The exchanged features (e.g., the control point notifications) may indicate to the second device one or more actions the second device may perform.

The QHCI 354 may determine whether a payload and/or a packet may transmit via a traditional BT bearer or a BToIP bearer. The BToIP protocol bearer may be a software enabled access point (SAP) bearer or an access point (AP) bearer. A BToIP protocol bearer may operate over multiple globally accepted ISM bands including, but not limited to, 2.4 GHz ISM band, 5 GHz ISM band, 6 GHz ISM band, and the like. In some implementations, a WLAN radio of the device and/or the App 308 (e.g., an App layer) of the device may be configured to select a globally accepted ISM band of the multiple globally accepted ISM bands over which the BToIP protocol bearer operates.

The QHCI 354 may be configured to determine whether a packet and/or payload should be transmitted via a Bluetooth bearer or a BToIP protocol bearer. If the QHCI 354 determines that the packet and/or payload is determined to be transmitted via a BToIP protocol bearer, then the QHCI 354 may be configured to route the packet and/or payload to the BToIP AC 356. In some implementations, the QHCI 354 may indicate to the BToIP AC 356 that the routed packet and/or payload should be transmitted via a BToIP bearer.

The BToIP application controller (BToIP AC) 356 may be configured to encapsulate packets to indicate that they are to transmit via a BToIP connection. For example, the BToIP AC 356 may add header to a packet that is to be transmitted over a BToIP bearer to a second device. The BToIP AC 356 may be configured to decapsulate packets received via a BToIP bearer and transmit the decapsulated packets to the other layers of the stack, such as the QHCI 354, App 308 and the like. For example, the BToIP AC 356 may decapsulate received BToIP packets by stripping away the BToIP headers of the received packets and transmit the decapsulated packets to other layers. The TCP/IP stack 358 may encapsulate BToIP packets with TCP/IP and/or TCP/UDP headers and transmit them to the WLAN MAC 360. The TCP/IP stack 358 may decapsulate received packets via BToIP connection and transmit them to other layers (e.g., BToIP AC 356). The WLAN MAC 360 may transmit and/or receive the BToIP packets via a WLAN radio of the first device, such as a Wi-Fi radio of the first device. The WLAN MAC 360 may be responsible for low level communication over the WLAN PHY 368.

In some implementations, the central device and/or peripheral devices described herein may be configured with a BToIP protocol stack. In some implementations, the central and/or peripheral devices described herein may be configured with other protocol stacks.

Figure 4A:
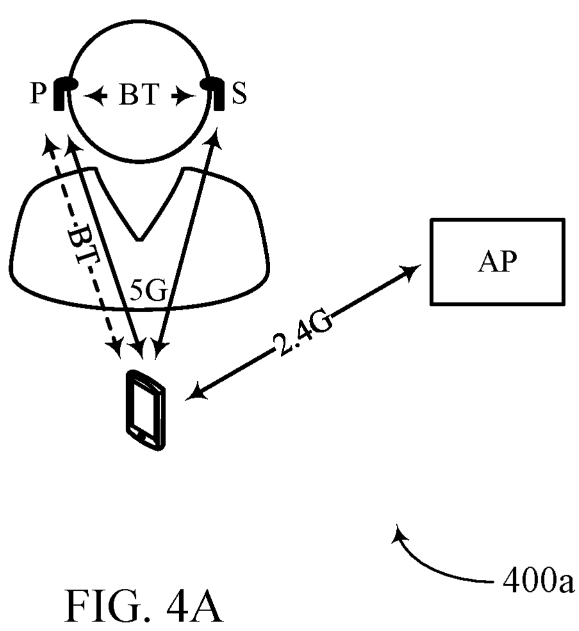
FIGS. 4A-4H illustrate example network topologies of devices communicating via BToIP protocol.
Figure 4B:
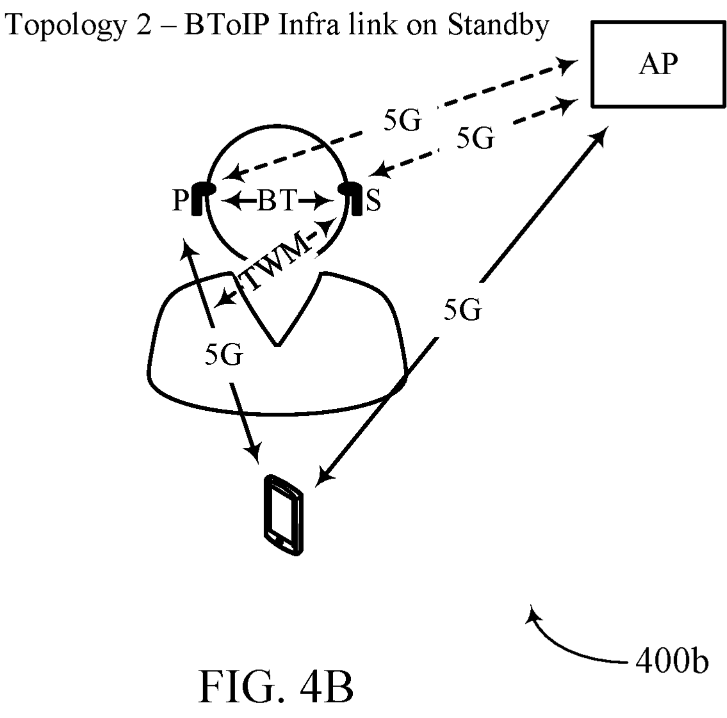
Figure 4C:
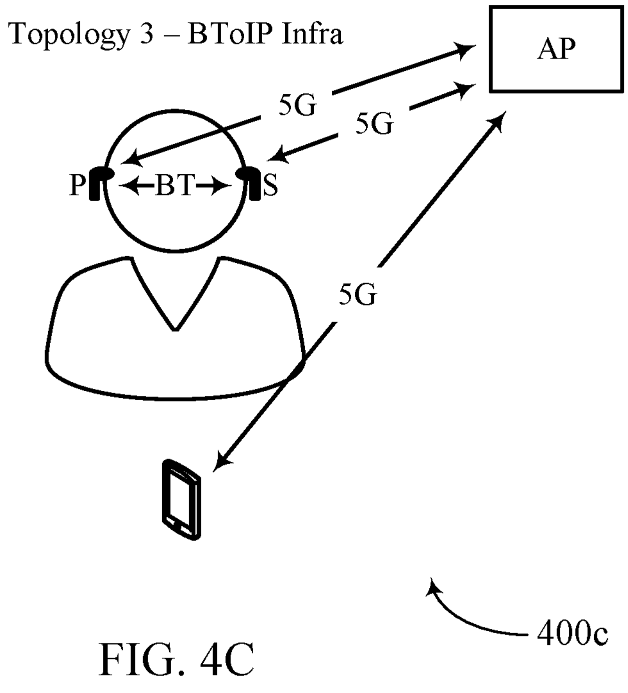
Figure 4D:
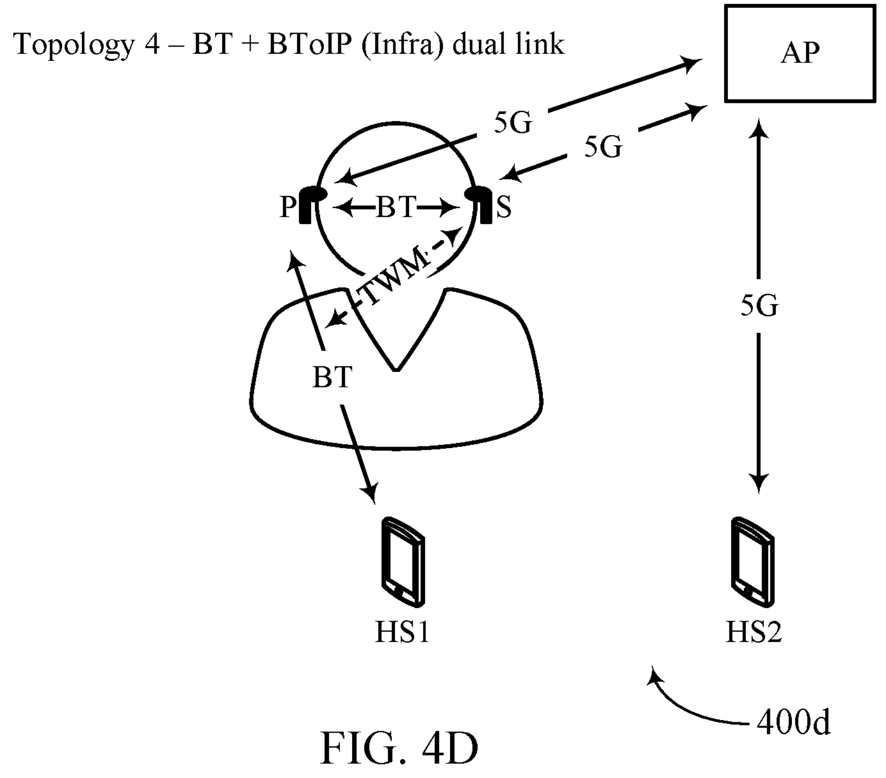
Figure 4E:
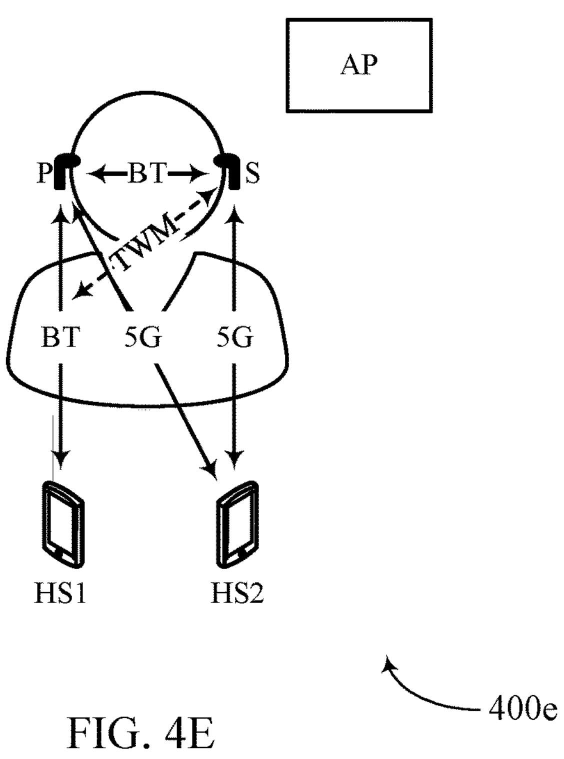
Figure 4F:
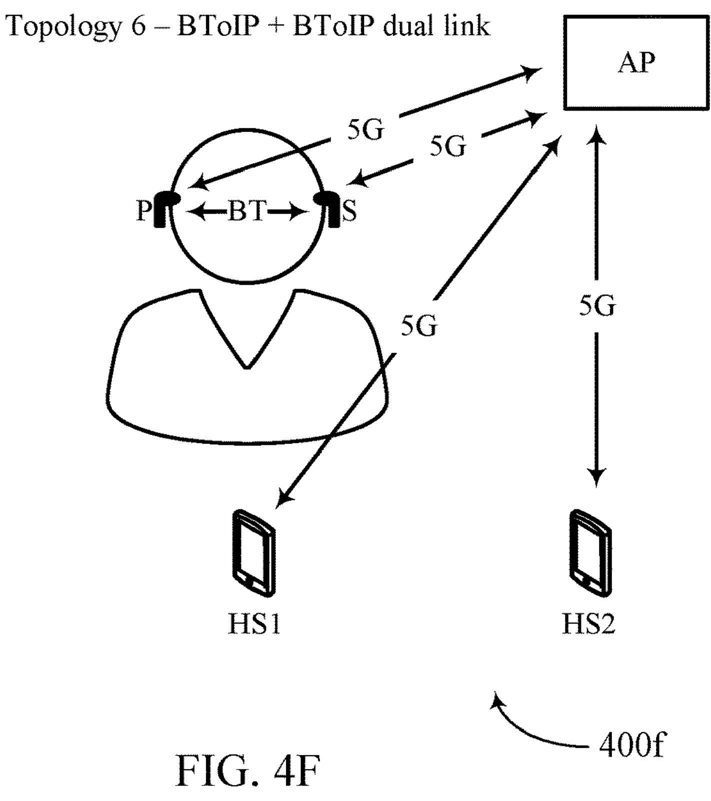
Figure 4G:
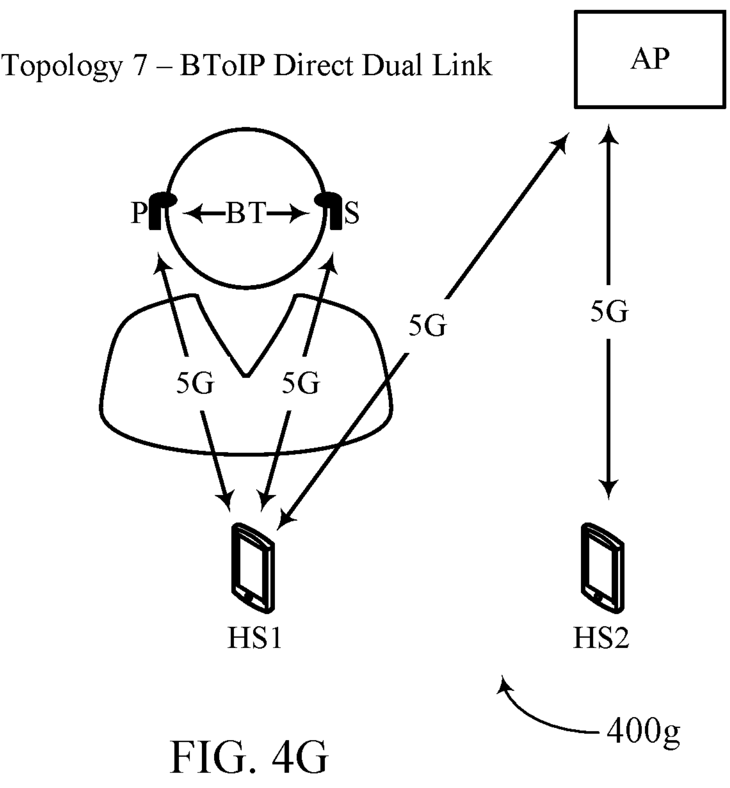
Figure 4H:
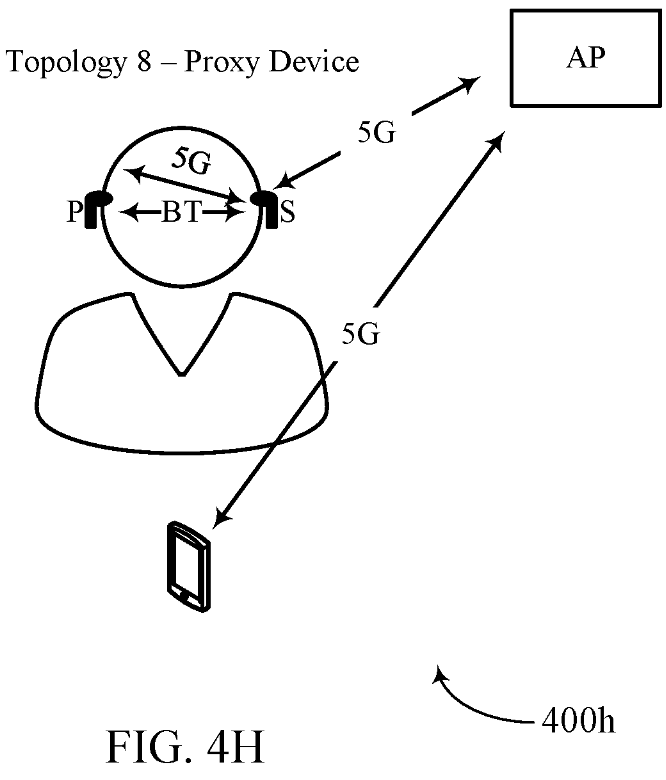

FIGS. 4A-4H illustrate various example network topologies of first device (e.g., peripheral device 112), second device (e.g., central device 102), and a third device (e.g., peripheral device 112) communicating via BToIP protocol. For example, FIG. 4A illustrates an example network topology 400*a*, FIG. 4B illustrates an example network topology 400*b*, FIG. 4C illustrates an example network topology 400*c*, FIG. 4D illustrates an example network topology 400*d*, FIG. 4E illustrates an example network topology 400*e*, FIG. 4F illustrates an example network topology 400*f*, FIG. 4G illustrates an example network topology 400*g*, and FIG. 4H illustrates an example network topology 400*h*.

Figure 5A:
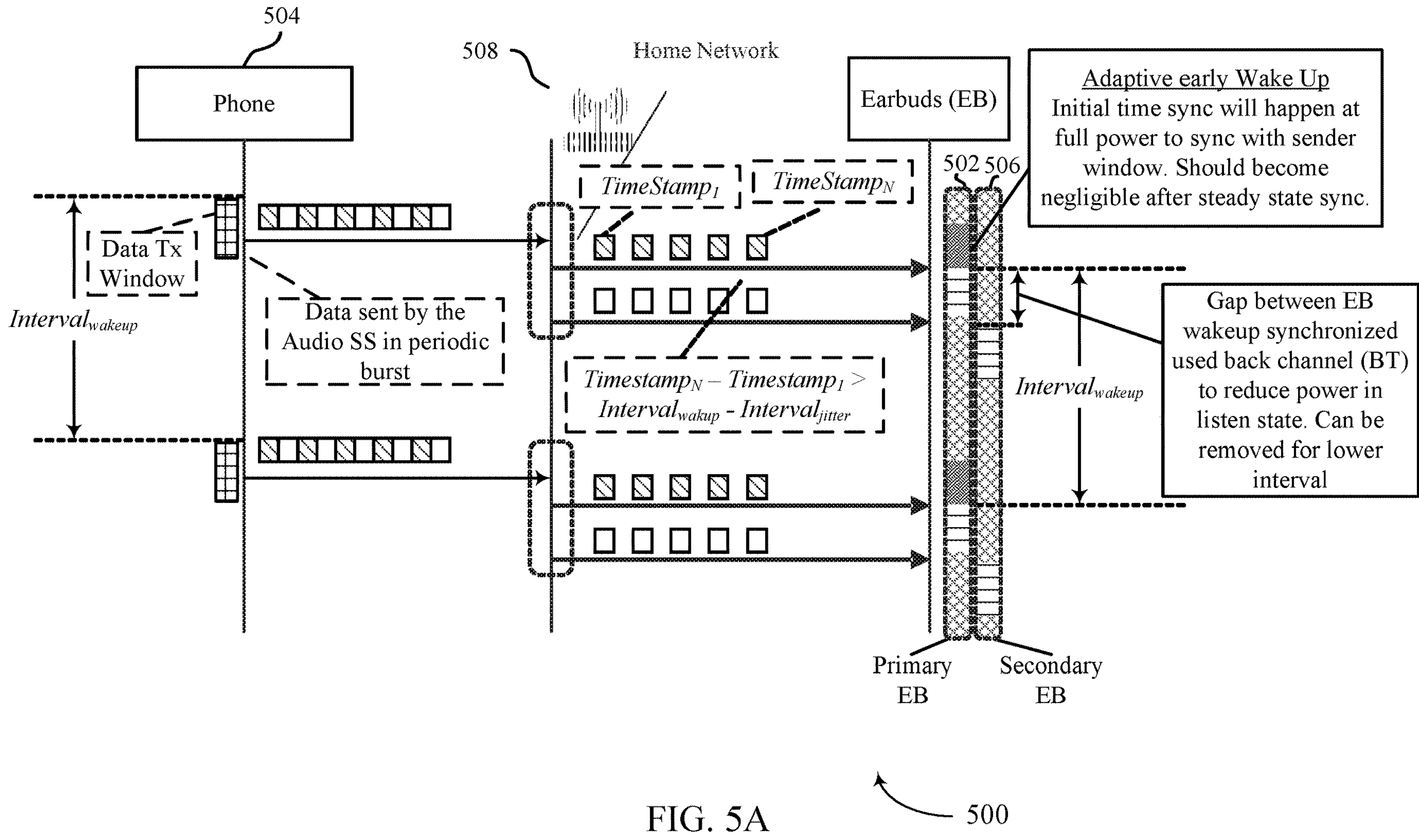
FIGS. 5A-5D illustrate a data flow between devices communicating via the BToIP protocol.
Figure 5B:
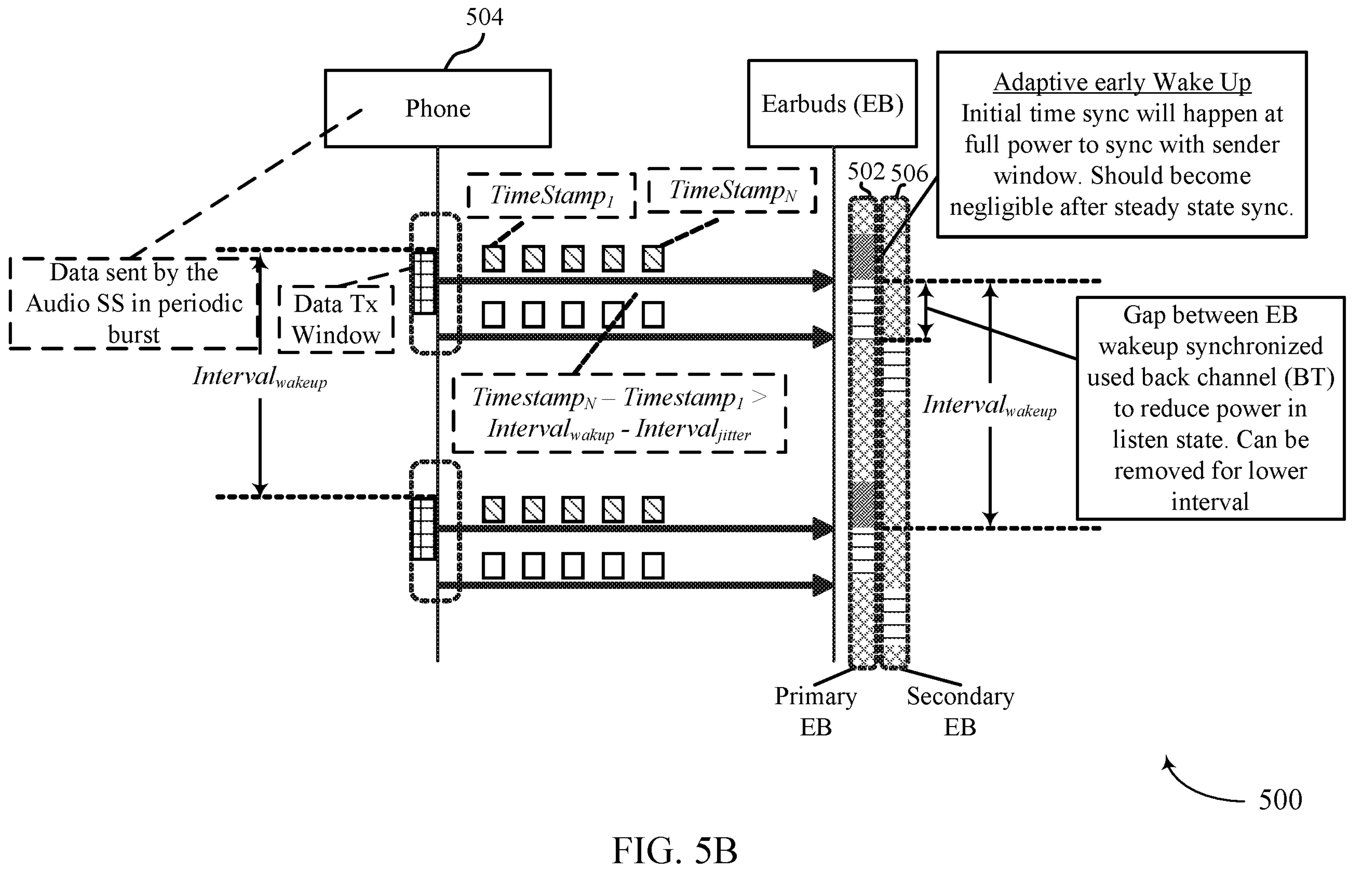
Figure 5C:
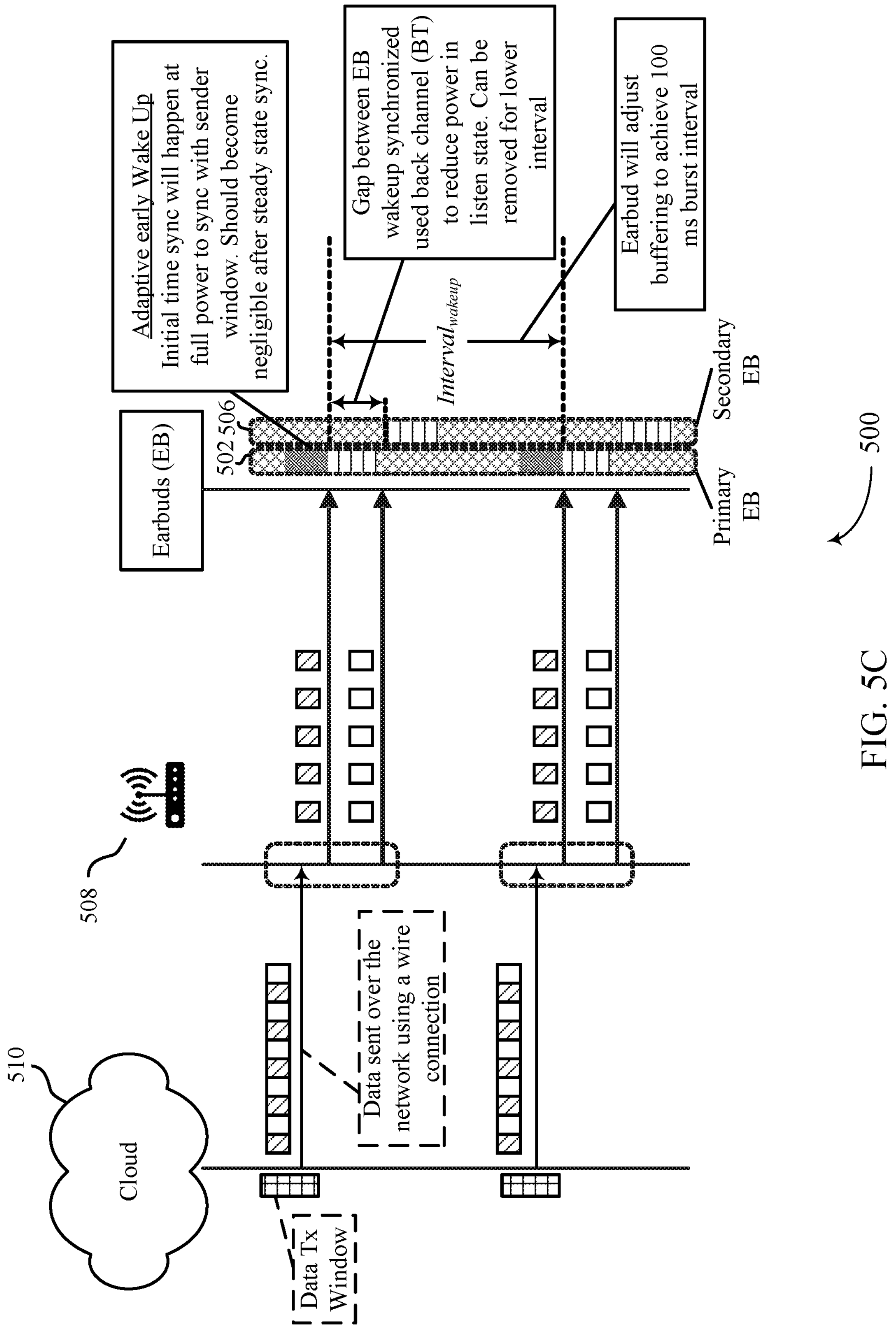
Figure 5D:
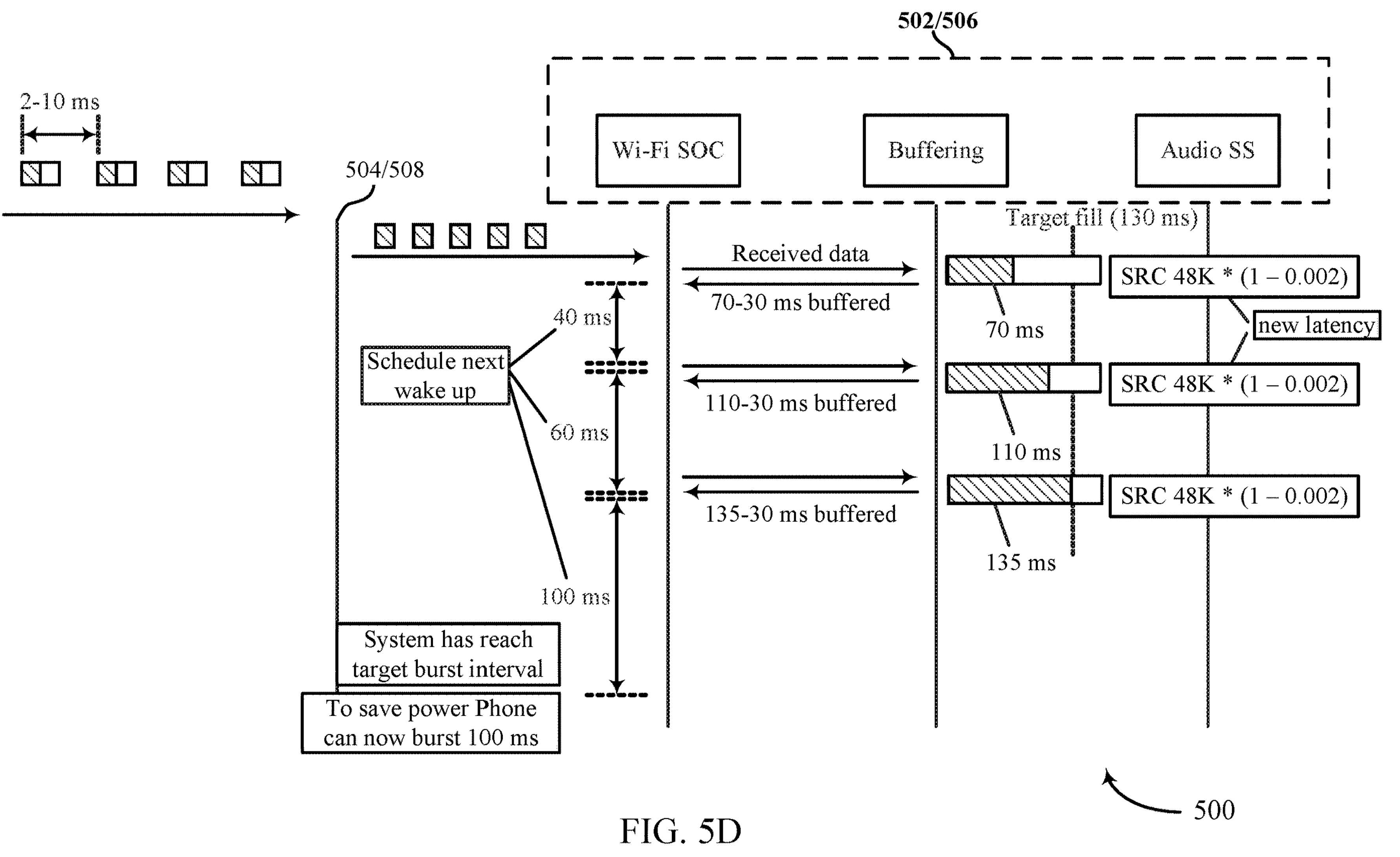

FIGS. 5A-5D illustrates a data flow 500 for communications between a first device 502, a second device 504, and a third device 506, and a fourth device 508 in a WPAN in accordance with some aspects of the disclosure. First device 502 may correspond to, e.g., peripheral device 104, 106, 108, 110, 112, 114, wireless device 200, the apparatus 702. Second device 504 may correspond to, e.g., central device 102, Third device 506 may correspond to e.g., peripheral device 104, 106, 108, 110, 112, 114, wireless device 200, the apparatus 702. The fourth device 508 may correspond to a network node (e.g., an access point (AP)). In FIG. 5D, the devices 502 and 506 may be connected to a device 510 in a cloud computing environment, such as a server computing device in a cloud computing environment, and the device 510 may host a source application and the device 510 may transmit packets associated with the host source application to the device 502 and/or 506.

In accordance with the techniques described herein, assistance may be received from applications running for audio or voice. In some aspects, traffic may be expected to be periodic in nature for media. In some implementations, one or more devices may support an adaptive wakeup that earbuds may learn over a training window and predict an expected arrival time of a packet from a source (e.g., coming over multiple hops from one or more APs). To decide when to go to sleep, a device may use one or more of the following application cues, including inspections in packet header to identify a shutdown condition (e.g., a timestamp), a number of packets received as compared to a number of packets expected, and buffer levels at an audio codec. To predict a next arrival time for wakeup, a device may use side band information for periodicity of traffic that is sent from a handset to the earbuds (e.g., interval). In some aspects, such a wakeup time may be synchronized between 2 (N) independent units (e.g., 2 earbuds) to wake up relative to each other to minimize power.

In the context of FIGS. 5A and 5B, when the EBs wake up may be learned from adaptive wakeup process and knowledge of the wakeup interval (passed on sideband). Further, when the EBs shut down may not based on guess work (like QPower) but based on timestamp of last packet-timestamp of first packet being greater than interval plus some jitter adjustments. The timestamps may be coming in end-to-end marking from source. In some implementations, the interval of wakeup may also be adapted based on network delays and not just fixed based on what was communicated by source at the beginning of a session. Further, a primary EB may tee off secondary EB in a synchronized manner to avoid unnecessary power burn.

In the context of FIG. 5D, which may be associated with adjusting the wakeup time interval and a change in network topology due to time variant channel or roaming, such conditions may trigger a latency change procedure. For example, such a latency change procedure may be associated with Wi-Fi adaptive early wakeup window moving to the right, Wi-Fi network change indication, a fill point on audio buffer reduces beyond a threshold, and when a proxy may be used to relay audio. A message may be sent by the earbud to change the burst period of the transmission from the source (e.g., the phone).

Figure 6:
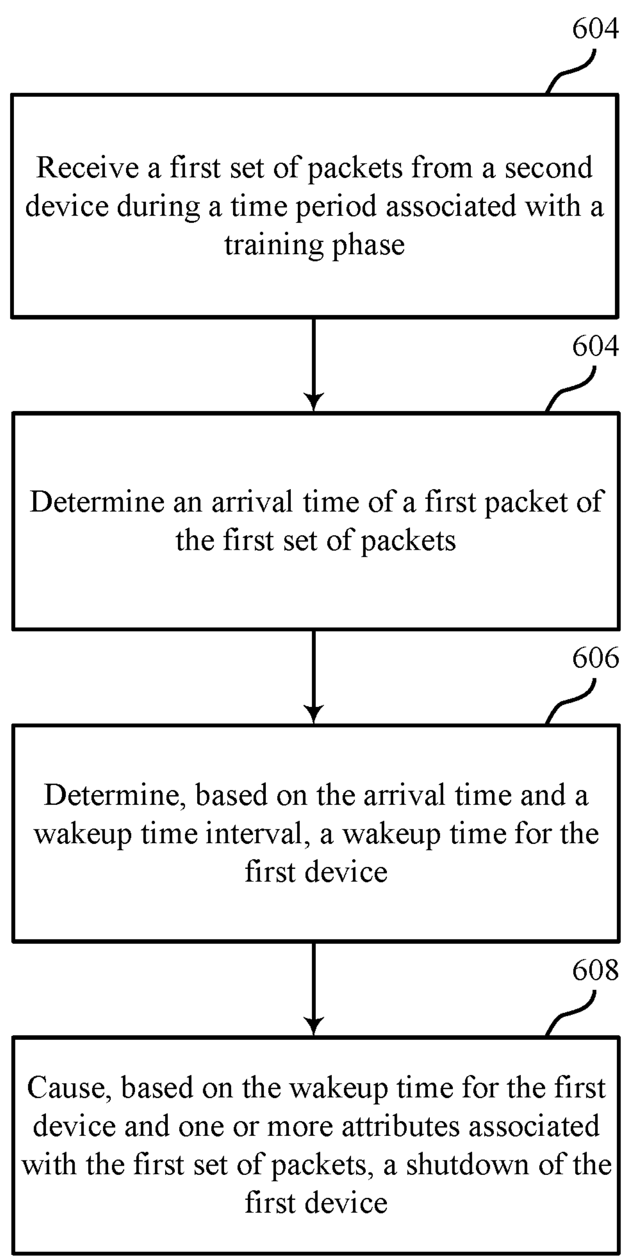
FIG. 6 is a flowchart of a method of wireless communication.

FIG. 6 is a flowchart 600 of a method of wireless communication. The method may be performed by a first device (e.g., the peripheral device 112, the apparatus 702). At 602, the first device receives a first set of packets from a second device (e.g., central device 102) during a time period associated with a training phase. At 604, the first device determines an arrival time of a first packet of the first set of packets. At 606, the first device determines, based on the arrival time and a wakeup time interval, a wakeup time for the first device. At 608, the first device, based on the wakeup time for the first device and one or more attributes associated with the first set of packets, a shutdown of the first device.

In some implementations, the one or more attributes associated with the first set of packets is a corresponding timestamp of one or more packets of the first set of packets. The first device may be configured to determine whether a difference between the corresponding timestamp of the first packet and the corresponding timestamp of an Nth packet of the one or more packets satisfies a threshold time difference. The first device may cause the shutdown in response to determining that the difference satisfies threshold difference.

In some implementations, the threshold time difference is based on the wakeup time interval and a jitter value. For example, the threshold time difference may be based on wakeup time interval-jitter interval or jitter value. For example, the first device may determine if the timestamp of the Nth packet minus the timestamp of the 1$^{st}$ packet is greater than wakeup time interval minus the jitter value or jitter interval. In some implementations, the first device may maintain a current power mode of the first device in response to determining that the difference fails to satisfy threshold difference. The first device may identify the Nth packet as a last packet of the first set of packets in response to determining that the difference satisfies threshold difference.

In some implementations, the one or more attributes associated with the first set of packets may be a total packet count of the first set of packets. The first device may determine whether the total packet count satisfies a threshold packet count. The first device may cause the shutdown in response to the total packet count satisfying a threshold packet count. The total packet count of the first set of packets may be based on a number of packets in the first set of packets. In some implementations, a total number packets in a burst interval from the second device may be transmitted to the first device. For example, the second device may indicate in a header of a packet of the set of packets a total number of packets that are transmitted in the burst interval. The first device may count until that total number of packets are received and cause a shutdown of the first device in response to receiving that total number of packets.

In some implementations, the one or more attributes associated with the first set of packets may be a corresponding amount of data associated with each packet of one or more packets of the first set of packets. The first device may calculate, based on the corresponding amount of data associated with each packet of the one or more packets, a total amount of data received. The first device may determine whether the total amount of data received satisfies a threshold amount of data. The first device may cause the shutdown of the first device in response to determining that the total amount of data received satisfies the threshold amount of data. In some implementations, the amount data corresponds to an amount of audio data and the total amount of data corresponds to a total amount of audio data.

In some implementations, the one or more attributes associated with the first set of packets is a fill level of a data buffer associated with one or more packets of the first set of packets. The first device may determine whether the fill level of the data buffer satisfies a threshold fill level. The first device may cause the shutdown of the first device in response to determining that the fill level of data buffer satisfies the threshold fill level. In some implementations, the data buffer is an audio data buffer. The first device may transmit a message to the second device in response to determining that the fill level of data buffer satisfies the threshold fill level. The message may indicate a pause in transmission of one or more packets to the first device.

The first device may determine, based on the shutdown of the first device, a wakeup time for a third device (e.g., a peripheral device 112, and the like). The first device may configure the third device to wake up at the determined wakeup time for the third device. The first device may transmit to the third device the determined wakeup time for the third device. In some implementations the first device may transmit the determined wakeup time via a sideband control channel. For example, the first device and the second device may be connected via BT communication link and the first device may transmit the determined wakeup time via BT sideband control channel to the third device.

In some implementations, the wakeup time interval may be associated with a source application of the first set of packets. In some implementations, the first device may send a signal to an access point indicating a shutdown of the first device during the shutdown process of the first device. The access point may be a software enabled access point (SAP) and the second device is the SAP to which the first device is directly connected.

The first device may receive a second set of packets during a second time period. The first device may determine an arrival time of a first packet of the second set of packets. The first device may determine a difference between the arrival time of the first packet of the second set of packets and an expected arrival time of the first packet of the second set of packets. The first device may determine whether the difference between the arrival time of the first packet of the second set of packets and the expected arrival time of the first packet of the second set of packets satisfies a threshold arrival time difference. In response to determining that the difference between the timestamp of the first packet of the second set of packets and the expected timestamp fails to satisfy the threshold arrival time difference, the first device may adjust the wakeup interval for the first device. The first device may transmit a message to the second device to change a burst interval of the second device to a new burst interval, wherein the new burst interval of the second device corresponds to the adjusted wakeup interval. In some implementations, the wakeup interval is adjusted by a predetermined threshold amount. In some implementations, adjusting a wakeup time interval may comprise increasing the wakeup time interval. In some implementations, the adjusting the wakeup time interval may comprise decreasing the wakeup time interval.

The first device may detect a change in a wireless local area network (WLAN) to which the first device is connected. In response to detecting the change in the WLAN, adjust the wakeup interval for the first device by a threshold amount. The first device may transmit a message to the second device to change a burst interval of the second device to a new burst interval, wherein the new burst interval of the second device corresponds to the adjusted wakeup interval.

In some implementations, the change in the WLAN is detected based on a change in an access point to which the first device is connected from a first access point to a second access point. The first access point may be a software enabled access point (SAP), the first device may be directly connected to the SAP via a WLAN communication link, and the second device may be the SAP. In some implementations, the second access point may be a third device, the first device may be directly connected to the third device via a first WLAN communication link, and the second device may be connected to the third device via a second WLAN communication link.

In some implementations, the first access point may be a third device, the second access point may be a software enabled access point (SAP), the first device may be directly connected to the SAP via a WLAN communication link, and the second device may be the SAP. In some implementations, the second device may be previously connected to the third device via a WLAN communication link.

In some implementations, the first access point may be a third device, the second access point may be a fourth device, and the first device may be connected to the fourth device via a first WLAN communication link, and the second device may be connected to the fourth device via a second WLAN communication link.

In some implementations, the first device may be directly connected to the second device, and the change in the WLAN comprises a change in a communication link between the first device and the second device from a first communication link to a second communication link. In some implementations, the first communication link may be a WLAN communication link, and the second communication link may be a Bluetooth communication link.

The first device may receive a second set of packets during a second time period. The first device may determine a buffer fill level of a buffer associated with the second set of packets. The first device may determine whether the buffer fill level of the buffer satisfies a threshold buffer fill level. The first device may adjust a wakeup time interval for the first device by a threshold amount in response to determining that the buffer fill level fails to satisfy the threshold buffer fill level. The first device may transmit a message to the second device to change a burst interval of the second device to a new burst interval, wherein the new burst interval of the second device corresponds to the adjusted wakeup interval. In some implementations, adjusting a wakeup time interval may comprise increasing the wakeup time interval. In some implementations, the adjusting the wakeup time interval may comprise decreasing the wakeup time interval. For example, if the buffer fill level fails to satisfy a minimum buffer fill level, then the wakeup time interval may be increased. Similarly, if the buffer fill level exceeds a higher buffer fill threshold, then the wakeup time interval may be decreased. The burst interval may be increased or decreased based on the increases and decreases of the wakeup time interval.

In some implementations, the first device and the second device may be synchronized and may share a common clock (e.g., a BT wallclock, Wi-Fi TSF, and the like). In some implementations, the first device and the second device may be synchronized according to IEEE 802.1AS and IEEE 1588-2019 standards. The first device may receive a second set of packets during a second time period, wherein each packet of the second set of packets comprises a corresponding timestamp based on the shared common clock. The first device may determine whether a difference between the corresponding timestamp of a first packet of the second set of packet and an expected timestamp of the first packet satisfies a threshold time difference. The first device may adjust the wakeup interval for the first device in response to determining that the difference fails to satisfy the threshold difference. The first device may transmit a message to the second device to change a burst interval of the second device to a new burst interval, wherein the new burst interval of the second device corresponds to the adjusted wakeup interval.

In some implementations, the second device may be a proxy device, and the second device may receive a second set of packets from a third device. The target device and/or the destination device for the second set of packets may be the first device. The first device may receive the second set of packets from the second device as a relay transmission from the second device. The first device may adjust the wakeup interval for the first device. The first device may transmit a message to the third device, wherein the message indicates a change to a burst interval of the third device to a new burst interval, and where the new burst interval of the third device corresponds to the adjusted wakeup interval. In some implementations, the second device may be a server computing device hosting a source application in a cloud computing environment, and a set of packets received from the second device may be associated with the source application hosted in the cloud computing environment.

In some implementations, the second device may be another peripheral device (e.g., peripheral device 112), such as an earbud, and the first device may be a peripheral device (e.g., peripheral device 112), such as another earbud, and the third device may be a central device (e.g., central device 102), such as a handset, a mobile phone, and the like. The second device may be a proxy device, and the second device may be connected to the third device (e.g., directly connected, via another device, such as an access point. The first device may not maintain a connection with the third device due to connection degradation or other connection issues, and may transition from being connected to the third device either directly or via an access point to being connected to the second device, where the second device is the proxy device. In some implementations, the first device may be connected to the third device via the second device (the proxy device). The third device may transmit packets for the first device to the second device. The second device may receive the packets for the first device from the third device, and transmit these received packets for the first device to the first device as a relay transmission.

In some implementations, the second device may adjust the wakeup time interval when the second device becomes the proxy device for the first device. In some implementations, the second device may adjust the wakeup time interval based at least part on the latency of the communication link between the second device and the first device. Therefore, the wakeup time interval is adjusted to take into account the latency between the second device and the first device. The second device may transmit a message to the third device indicating a change to a burst interval of the third device to a new burst interval, and where the new burst interval of the third device corresponds to the adjusted wakeup time interval.

Figure 7:
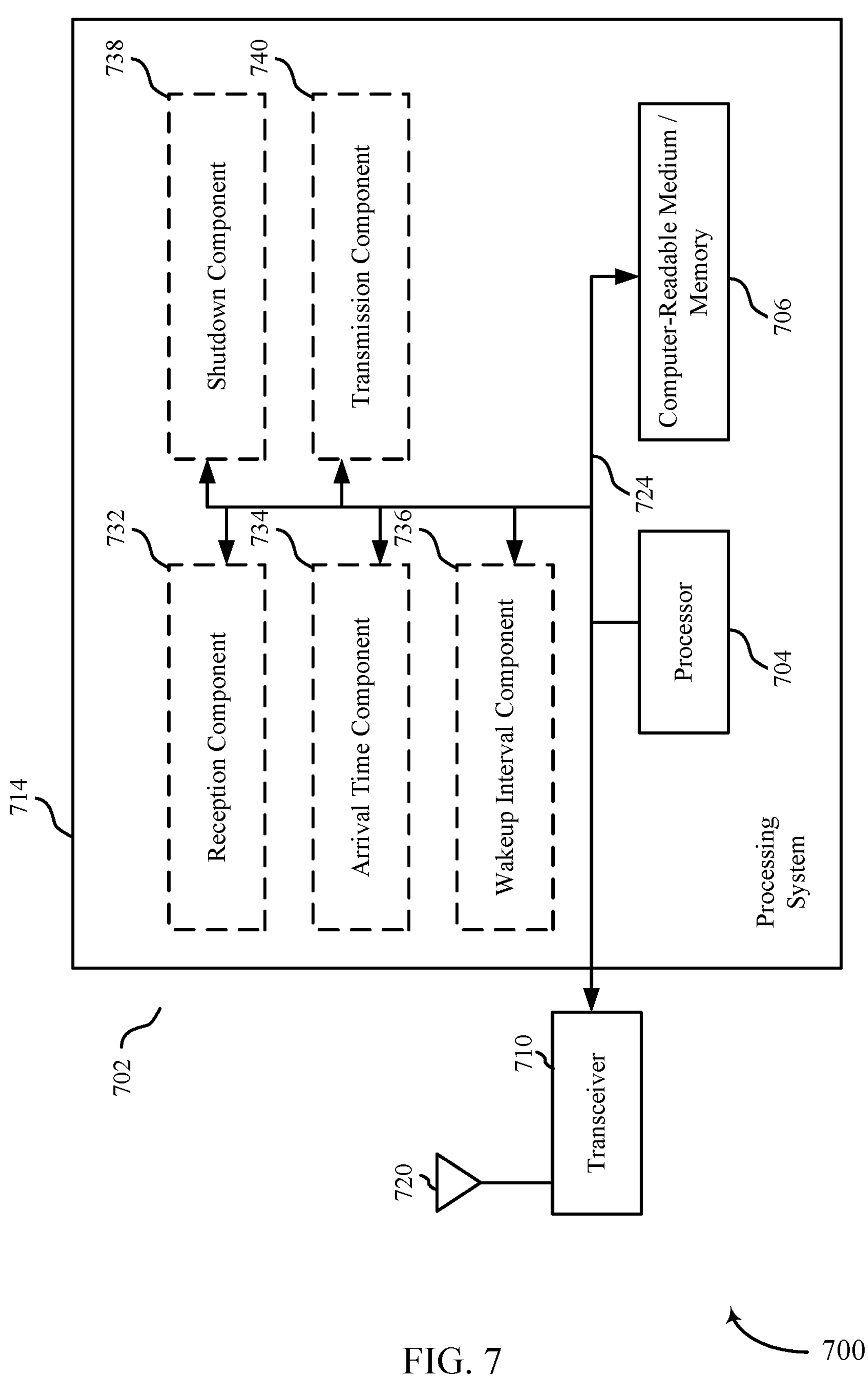
FIG. 7 is a diagram illustrating an example of a hardware implementation for an apparatus employing a processing system.

FIG. 7 is a diagram 700 illustrating an example of a hardware implementation for an apparatus 702 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 732, 734, 736, 738, 740 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component. In addition, the transceiver 710 receives information from the processing system 714, specifically the transmission component, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 732, 734, 736, 738, 740. The components may be software components running in the processor 704, resident/stored in the computer readable medium/memory 706, one or more hardware components coupled to the processor 704, or some combination thereof.

In some configurations, the apparatus 702 for wireless communication may include means for receiving a first set of packets from a second device during a time period associated with a training phase for the first device, means for determining an arrival time of a first packet of the first set of packets, means for determining, based on the arrival time and a wakeup time interval, a wakeup time for the first device, means for causing, based on the wakeup time for the first device and one or more attributes associated with the first set of packets, a shutdown of the first device. The aforementioned means may be the processor(s) 202, the radio 230, the MMU 240, the WLAN controller 250, the short-range communication controller 252, and/or the WWAN controller 256, one or more of the aforementioned components of the apparatus 702 and/or the processing system 714 of the apparatus 702 configured to perform the functions recited by the aforementioned means.

The following provides an overview of aspects of the present disclosure:

Aspect 1: A method of wireless communication for a first device, comprising: receiving a first set of packets from a second device during a time period associated with a training phase for the first device; determining an arrival time of a first packet of the first set of packets; determining, based on the arrival time and a wakeup time interval, a wakeup time for the first device; and causing, based on the wakeup time for the first device and one or more attributes associated with the first set of packets, a shutdown of the first device.

Aspect 2: The method of aspect 1, wherein the one or more attributes associated with the first set of packets is a corresponding timestamp of one or more packets of the first set of packets, and wherein causing the shutdown of the first device further comprises: determining whether a difference between the corresponding timestamp of the first packet and the corresponding timestamp of an Nth packet of the one or more packets satisfies a threshold time difference, wherein the threshold time difference is based on the wakeup time interval and a jitter value; and causing the shutdown of the first device in response to determining that the difference satisfies threshold difference.

Aspect 3: The method of aspect 2, further comprising: maintaining a current power mode of the first device in response to determining that the difference fails to satisfy threshold difference.

Aspect 4: The method of any of aspects 1 through 3, wherein the one or more attributes associated with the first set of packets is a total packet count of the first set of packets, and wherein causing the shutdown of the first device further comprises: determining whether the total packet count satisfies a threshold packet count, wherein the total packet count of the first set of packets is based on a number of packets in the first set of packets; and in response to the total packet count satisfying a threshold packet count, causing the shutdown of the first device.

Aspect 5: The method of any of aspects 1 through 4, wherein the one or more attributes associated with the first set of packets is a corresponding amount of audio data associated with each packet of one or more packets of the first set of packets, and wherein causing the shutdown of the first device further comprises: calculating, based on the corresponding amount of audio data associated with each packet of the one or more packets, a total amount of audio data received; determining whether the total amount of audio data received satisfies a threshold amount of data; and causing the shutdown of the first device in response to determining that the total amount of audio data received satisfies the threshold amount of data.

Aspect 6: The method of any of aspects 1 through 5, wherein the one or more attributes associated with the first set of packets is a fill level of an audio data buffer associated with one or more packets of the first set of packets, and wherein causing the shutdown of the first device further comprises: determining whether the fill level of the audio data buffer satisfies a threshold fill level; and causing the shutdown of the first device in response to determining that the fill level of audio data buffer satisfies the threshold fill level.

Aspect 7: The method of aspect 6, further comprising: in response to determining that the fill level of audio data buffer satisfies the threshold fill level, transmitting a message to the second device, wherein the message indicates a pause in transmission of one or more packets to the first device.

Aspect 8: The method of any of aspects 1 through 7, further comprising: determining, based on the shutdown of the first device, a wakeup time for a third device; configuring the third device to wake up at the determined wakeup time for the third device; and transmitting to the third device the determined wakeup time for the third device via a sideband control channel.

Aspect 9: The method of any of aspects 1 through 8, wherein the wakeup time interval is associated with a source application of the first set of packets.

Aspect 10: The method of any of aspects 1 through 9, wherein causing the shutdown of the first device comprises sending a signal to an access point indicating the shutdown of the first device, and the access point is a software enabled access point (SAP) and the second device is the SAP.

Aspect 11: The method of any of aspects 1 through 10, further comprising: receiving a second set of packets during a second time period; determining an arrival time of a first packet of the second set of packets; determining a difference between the arrival time of the first packet of the second set of packets and an expected arrival time of the first packet of the second set of packets; determining whether the difference between the arrival time of the first packet of the second set of packets and the expected arrival time of the first packet of the second set of packets satisfies a threshold arrival time difference; and in response to determining that the difference between the arrival time of the first packet of the second set of packets and the expected arrival time fails to satisfy the threshold arrival time difference: adjusting the wakeup interval for the first device by a predetermined threshold amount; and transmitting a message to the second device to change a burst interval of the second device to a new burst interval, wherein the new burst interval of the second device corresponds to the adjusted wakeup interval.

Aspect 12: The method of any of aspects 1 through 11, further comprising: detecting a change in a WLAN to which the first device is connected; and in response to detecting the change in the WLAN: adjusting the wakeup interval for the first device by a threshold amount; and transmitting a message to the second device to change a burst interval of the second device to a new burst interval, wherein the new burst interval of the second device corresponds to the adjusted wakeup interval.

Aspect 13: The method of aspect 12, wherein the change in the WLAN is detected based on a change in an access point to which the first device is connected from a first access point to a second access point.

Aspect 14: The method of aspect 13, wherein the first access point is a software enabled access point (SAP), the first device is directly connected to the SAP via a WLAN communication link, and the second device is the SAP, the second access point is a third device, the first device is directly connected to the third device via a first WLAN communication link, and the second device is connected to the third device via a second WLAN communication link.

Aspect 15: The method of any of aspects 13 through 14, wherein the first access point is a third device, the second access point is a software enabled access point (SAP), the first device is directly connected to the SAP via a WLAN communication link, and the second device is the SAP, the second device was previously connected to the third device via a WLAN communication link.

Aspect 16: The method of any of aspects 13 through 15, wherein the first access point is a third device, the second access point is a fourth device, and the first device is connected to the fourth device via a first WLAN communication link, and the second device is connected to the fourth device via a second WLAN communication link.

Aspect 17: The method of any of aspects 12 through 16, wherein the first device is directly connected to the second device, and the change in the WLAN comprises a change in a communication link between the first device and the second device from a first communication link to a second communication link, the first communication link is a WLAN communication link, and the second communication link is a Bluetooth communication link.

Aspect 18: The method of any of aspects 1 through 17, further comprising: receiving a second set of packets during a second time period; determining a buffer fill level of a buffer associated with the second set of packets; determining whether the buffer fill level of the buffer satisfies a threshold buffer fill level; and in response to determining that the buffer fill level fails to satisfy the threshold buffer fill level: adjusting a wakeup time interval for the first device by a threshold amount; and transmitting a message to the second device to change a burst interval of the second device to a new burst interval, wherein the new burst interval of the second device corresponds to the adjusted wakeup interval.

Aspect 19: The method of any of aspects 1 through 18, wherein the second device is a proxy device, wherein the second device receives a second set of packets from a third device, and the method further comprises: receiving the second set of packets from the second device as a relay transmission from the second device; adjusting the wakeup interval for the first device; and transmitting a message to the third device, wherein the message indicates a change to a burst interval of the third device to a new burst interval, and wherein the new burst interval of the second device corresponds to the adjusted wakeup interval.

Aspect 20: The method of any of aspects 1 through 19, wherein the second device is a server computing device hosting a source application in a cloud computing environment, and the first set of packets is associated with the source application.

Aspect 21: The method of any of aspects 1 through 20, further comprising: identifying the Nth packet as a last packet of the first set of packets in response to determining that the difference satisfies threshold difference.

Aspect 22: The method of claim of any of aspects 1 through 21, wherein the first device and the second device share a common clock, and the method further comprising: receiving a second set of packets during a second time period, wherein each packet of the second set of packets comprises a corresponding timestamp based on the shared common clock; determining whether a difference between the corresponding timestamp of a first packet of the second set of packets and an expected timestamp of the first packet satisfies a threshold difference; and in response to determining that the difference fails to satisfy the threshold difference: adjusting the wakeup interval for the first device; and transmitting a message to the second device to change a burst interval of the second device to a new burst interval, wherein the new burst interval of the second device corresponds to the adjusted wakeup interval.

Aspect 23: An apparatus comprising a processor; memory coupled with the processor; and instructions stored in the memory and executable by the processor to cause the apparatus to perform a method of any of aspects 1 through 22.

Aspect 24: An apparatus comprising at least one means for performing a method of any of aspects 1 through 22.

Aspect 25: A non-transitory computer-readable medium storing code the code comprising instructions executable by a processor to perform a method of any of aspects 1 through 22.

It is understood that the specific order or hierarchy of blocks in the processes or flowcharts disclosed is an illustration of exemplary approaches. Based upon design preferences, it is understood that the specific order or hierarchy of blocks in the processes or flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a first device, comprising:

receiving a first set of packets from a second device during a time period associated with a training phase for the first device;

determining an arrival time of a first packet of the first set of packets;

determining, based on the arrival time and a wakeup time interval, a wakeup time for the first device;

causing, based on the wakeup time for the first device and one or more attributes associated with the first set of packets, a shutdown of the first device;

wherein the one or more attributes associated with the first set of packets is a corresponding timestamp of one or more packets of the first set of packets, and wherein causing the shutdown of the first device further comprises:

determining whether a difference between the corresponding timestamp of the first packet and the corresponding timestamp of an Nth packet of the one or more packets satisfies a threshold time difference, wherein the threshold time difference is based on the wakeup time interval and a jitter value; and causing the shutdown of the first device in response to determining that the difference satisfies threshold difference.

2. The method of claim 1, further comprising:

maintaining a current power mode of the first device in response to determining that the difference fails to satisfy threshold difference.

3. The method of claim 1 further comprising:

identifying the Nth packet as a last packet of the first set of packets in response to determining that the difference satisfies threshold difference.

4. The method of claim 1, wherein the one or more attributes associated with the first set of packets is a total packet count of the first set of packets, and wherein causing the shutdown of the first device further comprises:

determining whether the total packet count satisfies a threshold packet count, wherein the total packet count of the first set of packets is based on a number of packets in the first set of packets; and in response to the total packet count satisfying a threshold packet count, causing the shutdown of the first device.

5. The method of claim 1, wherein the one or more attributes associated with the first set of packets is a corresponding amount of audio data associated with each packet of one or more packets of the first set of packets, and wherein causing the shutdown of the first device further comprises:

calculating, based on the corresponding amount of audio data associated with each packet of the one or more packets, a total amount of audio data received;

determining whether the total amount of audio data received satisfies a threshold amount of data; and causing the shutdown of the first device in response to determining that the total amount of audio data received satisfies the threshold amount of data.

6. The method of claim 1, wherein the one or more attributes associated with the first set of packets is a fill level of an audio data buffer associated with one or more packets of the first set of packets, and wherein causing the shutdown of the first device further comprises:

determining whether the fill level of the audio data buffer satisfies a threshold fill level; and causing the shutdown of the first device in response to determining that the fill level of audio data buffer satisfies the threshold fill level.

7. The method of claim 6, further comprising:

in response to determining that the fill level of audio data buffer satisfies the threshold fill level, transmitting a message to the second device, wherein the message indicates a pause in transmission of one or more packets to the first device.

8. The method of claim 1, further comprising:

determining, based on the shutdown of the first device, a wakeup time for a third device;

configuring the third device to wake up at the determined wakeup time for the third device; and transmitting to the third device the determined wakeup time for the third device via a sideband control channel.

9. The method of claim 1, wherein the wakeup time interval is associated with a source application of the first set of packets.

10. The method of claim 1, wherein causing the shutdown of the first device comprises sending a signal to an access point indicating the shutdown of the first device, and wherein the access point is a software enabled access point (SAP) and the second device is the SAP.

11. The method of claim 1, further comprising:

receiving a second set of packets during a second time period;

determining an arrival time of a first packet of the second set of packets;

determining a difference between the arrival time of the first packet of the second set of packets and an expected arrival time of the first packet of the second set of packets;

determining whether the difference between the arrival time of the first packet of the second set of packets and the expected arrival time of the first packet of the second set of packets satisfies a threshold arrival time difference; and in response to determining that the difference between the arrival time of the first packet of the second set of packets and the expected arrival time fails to satisfy the threshold arrival time difference:

adjusting the wakeup interval for the first device by a predetermined threshold amount; and transmitting a message to the second device to change a burst interval of the second device to a new burst interval, wherein the new burst interval of the second device corresponds to the adjusted wakeup interval.

12. The method of claim 1, further comprising:

detecting a change in a wireless local area network (WLAN) to which the first device is connected; and in response to detecting the change in the WLAN:

adjusting the wakeup interval for the first device by a threshold amount; and transmitting a message to the second device to change a burst interval of the second device to a new burst interval, wherein the new burst interval of the second device corresponds to the adjusted wakeup interval.

13. The method of claim 12, wherein the change in the WLAN is detected based on a change in an access point to which the first device is connected from a first access point to a second access point.

14. The method of claim 13, wherein the first access point is a software enabled access point (SAP), the first device is directly connected to the SAP via a WLAN communication link, and the second device is the SAP, wherein the second access point is a third device, the first device is directly connected to the third device via a first WLAN communication link, and the second device is connected to the third device via a second WLAN communication link.

15. The method of claim 13, wherein the first access point is a third device, the second access point is a software enabled access point (SAP), the first device is directly connected to the SAP via a WLAN communication link, and the second device is the SAP, wherein the second device was previously connected to the third device via a WLAN communication link.

16. The method of claim 13, wherein the first access point is a third device, the second access point is a fourth device, and the first device is connected to the fourth device via a first WLAN communication link, and the second device is connected to the fourth device via a second WLAN communication link.

17. The method of claim 12, wherein the first device is directly connected to the second device, and the change in the WLAN comprises a change in a communication link between the first device and the second device from a first communication link to a second communication link, wherein the first communication link is a WLAN communication link, and the second communication link is a Bluetooth communication link.

18. The method of claim 1, further comprising:

receiving a second set of packets during a second time period;

determining a buffer fill level of a buffer associated with the second set of packets;

determining whether the buffer fill level of the buffer satisfies a threshold buffer fill level; and in response to determining that the buffer fill level fails to satisfy the threshold buffer fill level:

adjusting a wakeup time interval for the first device by a threshold amount; and transmitting a message to the second device to change a burst interval of the second device to a new burst interval, wherein the new burst interval of the second device corresponds to the adjusted wakeup interval.

19. The method of claim of claim 1, wherein the first device and the second device share a common clock, and the method further comprising:

receiving a second set of packets during a second time period, wherein each packet of the second set of packets comprises a corresponding timestamp based on the shared common clock;

determining whether a difference between the corresponding timestamp of a first packet of the second set of packets and an expected timestamp of the first packet satisfies a threshold difference; and in response to determining that the difference fails to satisfy the threshold difference:

adjusting the wakeup interval for the first device; and transmitting a message to the second device to change a burst interval of the second device to a new burst interval, wherein the new burst interval of the second device corresponds to the adjusted wakeup interval.

20. The method of claim 1, wherein the second device is a proxy device, wherein the second device receives a second set of packets from a third device, and the method further comprises:

receiving the second set of packets from the second device as a relay transmission from the second device;

adjusting the wakeup interval for the first device; and transmitting a message to the third device, wherein the message indicates a change to a burst interval of the third device to a new burst interval, and wherein the new burst interval of the second device corresponds to the adjusted wakeup interval.

21. The method of claim 1, wherein the second device is a server computing device hosting a source application in a cloud computing environment, and wherein the first set of packets is associated with the source application.

22. An apparatus for wireless communication for a first device, comprising:

one or more memories; and one or more processors coupled to the one or more memories and configured to:

receive a first set of packets from a second device during a time period associated with a training phase for the first device;

determine an arrival time of a first packet of the first set of packets;

determine, based on the arrival time and a wakeup time interval, a wakeup time for the first device;

cause, based on the wakeup time for the first device and one or more attributes associated with the first set of packets, a shutdown of the first device;

wherein the one or more attributes associated with the first set of packets is a corresponding timestamp of one or more packets of the first set of packets, and wherein, to cause the shutdown of the first device further, the one or more processors is configured to:

determine whether a difference between the corresponding timestamp of the first packet and the corresponding timestamp of an Nth packet of the one or more packets satisfies a threshold time difference, wherein the threshold time difference is based on the wakeup time interval and a jitter value; and cause the shutdown of the first device in response to determining that the difference satisfies threshold difference.

23. The apparatus of claim 22, wherein the one or more processors is configured to:

maintain a current power mode of the first device in response to determining that the difference fails to satisfy threshold difference.

24. The apparatus of claim 22, wherein the one or more processors is configured to:

identify the Nth packet as a last packet of the first set of packets in response to determining that the difference satisfies threshold difference.

25. The apparatus of claim 22, wherein the one or more attributes associated with the first set of packets is a total packet count of the first set of packets, and wherein, to cause the shutdown of the first device further, the one or more processors is configured to:

determine whether the total packet count satisfies a threshold packet count, wherein the total packet count of the first set of packets is based on a number of packets in the first set of packets; and in response to the total packet count satisfying a threshold packet count, cause the shutdown of the first device.

26. The apparatus of claim 22, wherein the one or more attributes associated with the first set of packets is a corresponding amount of audio data associated with each packet of one or more packets of the first set of packets, and wherein, to cause the shutdown of the first device further, the one or more processors is configured to:

calculate, based on the corresponding amount of audio data associated with each packet of the one or more packets, a total amount of audio data received;

determine whether the total amount of audio data received satisfies a threshold amount of data; and cause the shutdown of the first device in response to determining that the total amount of audio data received satisfies the threshold amount of data.

27. A non-transitory computer readable medium storing computer executable code for a first device, the code comprising instructions executable by a processor to:

receive a first set of packets from a second device during a time period associated with a training phase for the first device;

determine an arrival time of a first packet of the first set of packets;

determine, based on the arrival time and a wakeup time interval, a wakeup time for the first device;

cause, based on the wakeup time for the first device and one or more attributes associated with the first set of packets, a shutdown of the first device;

wherein the one or more attributes associated with the first set of packets is a corresponding timestamp of one or more packets of the first set of packets, and wherein causing the shutdown of the first device further comprises:

determining whether a difference between the corresponding timestamp of the first packet and the corresponding timestamp of an Nth packet of the one or more packets satisfies a threshold time difference, wherein the threshold time difference is based on the wakeup time interval and a jitter value; and causing the shutdown of the first device in response to determining that the difference satisfies threshold difference.

28. An apparatus for wireless communication for a first device, comprising:

means for receiving a first set of packets from a second device during a time period associated with a training phase for the first device;

means for determining an arrival time of a first packet of the first set of packets;

means for determining, based on the arrival time and a wakeup time interval, a wakeup time for the first device;

means for causing, based on the wakeup time for the first device and one or more attributes associated with the first set of packets, a shutdown of the first device;

wherein the one or more attributes associated with the first set of packets is a corresponding timestamp of one or more packets of the first set of packets, and wherein causing the shutdown of the first device further comprises:

determining whether a difference between the corresponding timestamp of the first packet and the corresponding timestamp of an Nth packet of the one or more packets satisfies a threshold time difference, wherein the threshold time difference is based on the wakeup time interval and a jitter value; and causing the shutdown of the first device in response to determining that the difference satisfies threshold difference.

* * * * *